(12) United States Patent
Darcy-Sharma (10) Patent No.: US 9,102,211 B2
(45) Date of Patent: Aug. 11, 2015

(54) KNUCKLE AND BUSHING ASSEMBLY

(71) Applicant: Diversified Machine, Inc., Wixom, MI (US)

(72) Inventor: Michelle Anne Darcy-Sharma, Farmington Hills, MI (US)

(73) Assignee: DIVERSIFIED MACHINE, INC., Wixom, MI (US)

( * ) Notice: Subject to any disclaimer, the term of this patent is extended or adjusted under 35 U.S.C. 154(b) by 0 days.

(21) Appl. No.: 13/869,298

(22) Filed: Apr. 24, 2013

(65) Prior Publication Data

US 2013/0232765 A1     Sep. 12, 2013

Related U.S. Application Data (62) Division of application No. 12/982,132, filed on Dec. 30, 2010, now Pat. No. 8,444,158.

(60) Provisional application No. 61/360,214, filed on Jun. 30, 2010.

(51) Int. Cl.
  *B60G 11/12*  (2006.01)
  *B60G 7/02*   (2006.01)
  (Continued)

(52) U.S. Cl.
  CPC .............. *B60G 11/12* (2013.01); *B60G 7/006* (2013.01); *B60G 7/02* (2013.01); *F16F 1/387* (2013.01);
  (Continued)

(58) Field of Classification Search
  CPC .......... B60G 11/12; B60G 7/006; B60G 7/02; B60G 2204/416; B60G 2206/50; B60G 2204/41; B60G 2204/143; B60G 2204/4104; F16F 1/387; F16F 1/3835; Y10T 29/49826; Y10T 29/49622; Y10T 29/49872; Y10T 29/49918
  USPC ............. 29/897.2, 422, 451, 455.1, 508, 510, 29/511, 513, 515–517; 403/131, 132, 133, 403/203, 220, 223, 225, 226, 228; 384/203, 384/206; 280/93.511, 124.125; 267/141.2, 267/141.3, 292, 293
  See application file for complete search history.

(56) References Cited

U.S. PATENT DOCUMENTS 3,147,964 A    9/1964  Wolf
3,408,124 A   10/1968  Melton et al.
(Continued)

FOREIGN PATENT DOCUMENTS

EP   0 147 662 A1   7/1985
FR      2695972 A1   3/1994
(Continued)

OTHER PUBLICATIONS

International Search Report, Written Opinion, International Application No. PCT/US2010/0625668 date mailed Apr. 6, 2011.
(Continued)

*Primary Examiner* — Alexander P Taousakis
*Assistant Examiner* — Matthew P Travers
(74) *Attorney, Agent, or Firm* — The Dodrusin Law Firm, P.C.

(57) ABSTRACT

A suspension coupling for use in a vehicle suspension system the suspension coupling including a knuckle and bushing assembly wherein the knuckle member is a cast aluminum piece having a passage for receiving a two-piece bushing having a formed, metal inner member and a molded, elastomeric outer member having extension members at each end. The bushing member is press-fit into the knuckle member and exhibits higher stiffness in the radial and axial directions and lower stiffness in the torsional and conical directions.

20 Claims, 2 Drawing Sheets

(51) Int. Cl.
*F16F 1/387* (2006.01)
*B60G 7/00* (2006.01)
*F16F 1/38* (2006.01)

(52) U.S. Cl.
CPC ......... *F16F 1/3835* (2013.01); *B60G 2204/143* (2013.01); *B60G 2204/41* (2013.01); *B60G 2204/4104* (2013.01); *B60G 2204/416* (2013.01); *B60G 2206/50* (2013.01); *Y10T 29/49622* (2015.01); *Y10T 29/49826* (2015.01); *Y10T 29/49872* (2015.01); *Y10T 29/49918* (2015.01)

(56) References Cited

U.S. PATENT DOCUMENTS

| | | | |
|---|---|---|---|
| 4,202,564 A | 5/1980 | Strader | |
| 4,316,643 A | 2/1982 | Burk et al. | |
| 4,343,560 A | 8/1982 | Chalmers | |
| 4,613,251 A | 9/1986 | Bellamy et al. | |
| 4,671,694 A | 6/1987 | Brenner et al. | |
| 5,024,425 A | 6/1991 | Schwerdt | |
| 5,058,867 A | 10/1991 | Hedano et al. | |
| 5,288,059 A | 2/1994 | Gautheron et al. | |
| 5,299,788 A | 4/1994 | Kanda | |
| 5,338,012 A | 8/1994 | Kranick | |
| 5,577,854 A | 11/1996 | Jacob et al. | |
| 5,820,115 A * | 10/1998 | Stevenson et al. | 267/293 |
| 5,865,429 A | 2/1999 | Gautheron | |
| 6,131,930 A | 10/2000 | Chalin | |
| 6,224,046 B1 | 5/2001 | Miyamoto | |
| 6,446,993 B1 | 9/2002 | Huszarik et al. | |
| 6,572,088 B2 | 6/2003 | Tadano et al. | |
| 6,910,670 B2 | 6/2005 | Kato | |
| 7,261,307 B2 * | 8/2007 | Nuno et al. | 280/124.151 |
| 7,306,209 B2 | 12/2007 | Vossel et al. | |
| 7,438,493 B2 | 10/2008 | Holmes et al. | |
| 2005/0212188 A1 | 9/2005 | Endo | |
| 2007/0102890 A1 | 5/2007 | Katagiri et al. | |
| 2007/0144839 A1* | 6/2007 | Seksaria et al. | 188/218 R |
| 2007/0209648 A1* | 9/2007 | Pronschinske et al. | 124/71 |
| 2007/0258671 A1 | 11/2007 | Siemer | |

FOREIGN PATENT DOCUMENTS

| | | |
|---|---|---|
| JP | 03-12029 | 2/1991 |
| JP | 2004-092816 | 3/2004 |
| WO | 2007097070 A1 | 8/2007 |

OTHER PUBLICATIONS

European Office Action dated May 13, 2014 (Application No. 10801359.0).

Japanese Office Action dated Aug. 22, 2014 (Applicant No. 2013-518367).

* cited by examiner

KNUCKLE AND BUSHING ASSEMBLY

CROSS REFERENCE TO RELATED APPLICATIONS

This application hereby claims priority to U.S. Provisional Patent Application No. 61/360,214, filed Jun. 30, 2010, to Darcey-Sharma; titled Knuckle and Bushing Assembly, the entire contents of which is incorporated herein.

FIELD OF THE DISCLOSURE

This disclosure generally relates to art integrated bushing for use in a suspension component such as a clevis knuckle for use in the suspension of a vehicle. More particularly, the present disclosure relates to an integrated bushing for use in knuckle of a suspension of a vehicle, the integrated bushing having improved performance, cost and other characteristics.

BACKGROUND

It is generally known for a vehicle to have a suspension system for providing a level ride, for managing the pitch, roll and yaw of the vehicle as it travels across varying terrains and dampening or managing acceleration and deceleration of the suspension components in varying operating conditions. As part of the suspension system, it is also known to generally utilise one or more structural attachment components (e.g., a clevis and pin) for coupling one suspension component with another suspension component. Traditionally such suspension components include a knuckle member having a passage therein for receiving a bushing for providing stiffness and damping to the coupling between the suspension component having the knuckle member and the suspension component having the attachment component (e.g., clevis member). The suspension component coupling typically uses a pin, bolt or other coupling member for coupling to the bushing member. Generally, the pin, bolt, or other member is located in a hole in the bushing to transfer forces from the one suspension component to the bushing located in the passage in the knuckle member. The bushing between the stock member and the knuckle member must exhibit relatively very high performance characteristics for dampening the transfer of loads between the suspension components. For many applications, it is important to have a knuckle-bushing arrangement that has relatively low torsional and conical stiffness (e.g., so that it affords suitable mobility of the suspension component) while having relatively high radial and axial stiffness (e.g., so that the bushing better transfers the loads between the suspension components). The achievement of such characteristics without a complicated and/or expensive structure has been difficult to achieve. Accordingly, there remains a long-felt need to provide a suspension coupling with improved characteristics that also preferably has relatively few components, a relatively low cost and improved other characteristics.

SUMMARY

In one exemplary embodiment, there is disclosed a suspension system for use in a vehicle. The suspension system includes an integrated knuckle and bushing assembly having a knuckle member having a first passage for receiving therein a bushing, the bushing is located within the first passage of the knuckle member and has an interference fit with the first passage. The bushing has a centrally located passage extending from a first end of the bushing to a second end of the bushing. The bushing passage (through which a suitable coupling member may be passed for attachment of a suspension component) defines an axis that is substantially aligned with a center axis of the first passage of the knuckle member. In one exemplary embodiment, the bushing member has a first, inner member having a shaped outer periphery and contains the centrally located passage. The bushing member further includes a second, outer member having an annular, formed shape. The bushing member includes a pair of axially spaced apart ears for providing enhanced axial stiffness and each ear has a pair of recesses or valleys on each side of the ear for providing improved torsional and conical flexibility to the bushing member. The ears and valleys extend annularly around the outer member. The outer member also has a center annular portion located between the ears for providing radial stiffness to the bushing member.

In one exemplary embodiment the knuckle member has a first extension member further defining the passage in the knuckle member and initially located in an extended position wherein the first extension member is at least partially extended in a direction generally aligned with the center axis of the first passage of the knuckle member and wherein the bushing member is located within the first passage of the knuckle member. In this embodiment, the bushing member is press fit within the passage and is contained within the passage of the knuckle member by a second end of the passage. Then the first extension member is formed from the extended position to a formed position (e.g., by bending, folding, or otherwise deforming) wherein the resulting deformed first extension member of the knuckle member extends over at least a portion of a first end portion of the bushing member to secure the bushing member within the first passage of the knuckle member (e.g., by forming a blocking structure).

In another exemplary embodiment, the second end of the passage of the knuckle member may also have a second extension member initially extending at least partially in a direction generally aligned with the center axis of the passage (which may also be in a direction substantially aligned of the first extension member prior to deformation). The second extension member may be formed to a second or formed position in which the second extension member extends over at least a portion of a second end portion of the bushing member such that the first and second extension members of the knuckle member secure the bushing member within the first passage of the knuckle member. The knuckle member may be made from a metal material (e.g., a cast aluminum-containing material such as an aluminum based alloy). Either or both of the first and second extension members may be parent metal formed. In one exemplary embodiment, the bushing member is preferably an annular shaped, elastomeric body having a formed peripheral surface. The formed peripheral surface of the bushing member may include one or more (and preferably two) generally annular and elastically deformable ear structures generally axially flanking a center portion of the bushing member and, more particularly, offset distally from the center portion in a direction along the axis of the passage of the knuckle member). The bushing member may be suitably dimensioned and shaped so that it can be pressed into the first passage in the knuckle member to have an interference fit with an interior wall defining the first passage. The bushing member may be dimensioned so that at least the central portion of the shaped elastomeric body is loaded in compression (e.g., radial compression). The bushing member may include a two-piece, molded body having an outer portion produced from an elastomeric material and, in particular, a material including, consisting essentially of, or consisting of a natural rubber material. The bushing member, in an exemplary embodiment includes a second piece that is an inner or core member having a through-hole and a shaped outer surface that is generally complementary in shape to the interior wall portion of the bushing member. For example, as with the shape of at least a portion of the interior wall portion, the shaped surface of the second piece may include a central, rounded or substantially spherical-shaped portion. It may also include first and second shaped end portions. The first and second end portions of the core of the bushing member preferably each have a smaller or narrow portion closer to the central portion and generally may grow larger in diameter toward the ends of the bushing member for providing a stronger bearing area for the pin. The shaped elastomeric body of the outer member, around the inner member, when the bushing member is press-fit into the passage in the knuckle member may have a section thickness at a central portion of the bushing member that is less than preferably about 4 millimeters (mm) and may have a section thickness at the central portion that is between preferably about 2 and 3 millimeters (mm). Further, the inner member preferably has first and second ends that each has a surface area sufficient for clamping by a suspension component such as a clevis pin. The inner member has a varying diameter annular shape having a larger diameter toward the first and second ends and a reducing diameter as axially toward the central portion where the diameter again becomes larger. This design provides larger ends surface areas for the inner member while providing reduced thickness of the inner member to provide improved conical flexibility of the bushing member.

In one exemplary embodiment, the first or outer member of the bushing member is a molded body that is injection molded over the second or metal core of the bushing member. The core may include a through hole for coupling the bushing member to one suspension component.

The outer member of the bushing member may be formed to include at least one or more ear structures that generally circumscribe the annular shaped outer member. The ear structures may be designed to stiffen in response to an axial force or movement of the bushing member relative to the knuckle member. The outer member may further include a reduced thickness portion on each side of the ear to form a pair of valleys that allows freer torsional and conical movement of the bushing member with respect to the knuckle member because there is no bushing member material in those directions around the ear structure during operation. Accordingly, the ear structures are designed to stiffen in response to axial forces applied to the bushing member during operation and the radial stiffness of the bushing member is improved by having the bushing member press-fit into the knuckle member.

In one exemplary embodiment the knuckle and bushing assembly may include a bushing member having a generally annular exterior surface complementary to the interior surface of the passage in the knuckle member and the exterior surface of the bushing member has a generally uncompressed diameter that is slightly larger than the diameter of the interior surface of the passage in the knuckle member such that the bushing member will have an interference fit in the passage. The interior surface of the passage of the knuckle member and the exterior surface of the bushing member may each have a substantially constant radius or rounded surface from one end to the other end; or a plurality of surfaces each of different radii (e.g., the surface having progressively varying radii). In one exemplary embodiment, the interior surface of the passage of the knuckle member and the exterior surface of the bushing member each may have a generally linear surface from substantially a first end to a second end. In one alternative exemplary embodiment, the interior surface of the passage of the knuckle member and the exterior surface of the bushing member each may have a generally non-linear or curvilinear surface over at least a portion of the length from substantially a first end to a second end.

The knuckle and bushing assembly may have a generally annular intermediate or central portion for the elastomeric body that is loaded in compression in the passage of the knuckle member. Once the bushing member is press-fit into the passage in the knuckle member to form the knuckle and bushing assembly, a central portion of the elastomeric outer member of knuckle member may have a radial section having a thickness of less than about 4 millimeters (mm) and greater than about 1 millimeter (mm) during operation of the knuckle and bushing assembly. Further, the radial section of the annular elastomeric outer member of the bushing member may have a thickness of about 2 to 3 millimeters (mm).

The knuckle and bushing assembly may include a knuckle member having an outer portion of the bushing having a pair of ears that each generally circumscribe the bushing member and each of the ears have a contoured outer surface defining a generally circumscribing contoured recessed area between the ears.

The knuckle and bushing assembly may further include at least one suspension component selected from the group of a clevis, a control arm, a pin, a king pin, a stabilizer bar, a shock, or any other suspension member that may utilize a bushing and any combination thereof.

There is also disclosed a method for manufacturing the knuckle and bushing assembly for use in a suspension assembly in a vehicle including the steps of producing the knuckle member having a passage extending there through. The knuckle member is produced having a first extension member located at one end of the passage and further defining the passage. At the same or different time a bushing is produced having a passage extending there through and the bushing is formed having a plurality of annular reduced portions located in the exterior surface of the bushing. The bushing is located within the passage of the knuckle member and is generally axially aligned in the passage in the knuckle member, the bushing for providing improved radial and axial stiffness for the suspension member to be coupled the knuckle member. Then the first extension member may be formed from its first position to a second position wherein it extends at least partially aligned offset with the center axis of the passage in the knuckle and the first extension member extends over at least a portion of the bushing to couple and contain the bushing within the passage of the knuckle member. The knuckle member may be produced to include a second extension member located at a second end of the passage. The second extension member may also be formed from a first position to a second position to securely couple the bushing member to the knuckle member. The second extension member may be formed as part of an initial cast structure.

The bushing member is produced as a two-piece construction wherein an inner member is produced from a metal, preferably steel, material in any known or appropriate process. In one exemplary embodiment the inner member is preferably a cold-formed member having a central portion having a generally spherical shape and conically shaped end portions with a central through-hole. The inner member may be located in a molding machine and the outer member is over-molded onto the inner member and may be injection molded in one particular exemplary embodiment. In one exemplary embodiment the inner member is first at least partially covered (e.g., coated) with a suitable adhesion promoter (e.g., an adhesive, a primer or both) such as a phosphate-based primer coating for promoting adhesion of the elastomeric outer member to the metal inner member. After being casted, the knuckle member may be machined to produce the first passage. The method for manufacturing an integrated knuckle and bushing assembly may include assembling and locating the bushing in radial compression, such as by press-fitting the bushing within the passage of the knuckle member prior to forming one or both ends of the passage of the knuckle member to secure the bushing within the passage.

DETAILED DESCRIPTION

A suspension system may be used in a vehicle for providing a level ride to the vehicle by managing the pitch, roll and yaw of the vehicle by dampening or managing acceleration and deceleration of the suspension components in varying operating conditions. The suspension system typically includes a plurality of suspension components such as a control arm, a pin, a king pin, strut, spring, shock absorber, steering component, wheel assembly component, mounting hardware and/or other known suspension. The suspension components may be coupled together using any known or appropriate coupling components. In one particular type of coupling a clevis and clevis pin may be used for coupling one suspension component with another suspension component. In one exemplary embodiment one suspension component may include the clevis and the other suspension component may include a knuckle member that may be coupled to the clevis using a clevis pin located in holes in each end of each arm or prong of the clevis. The clevis pin may be secured, to the clevis using any known or appropriate fastener such as a nut on a threaded end of the clevis pin, similar to a bolt. In this type of suspension coupling, the knuckle member may include a passage or hole for receiving the main portion of the clevis pin and thereby coupling the clevis to the knuckle member.

Figure 1:
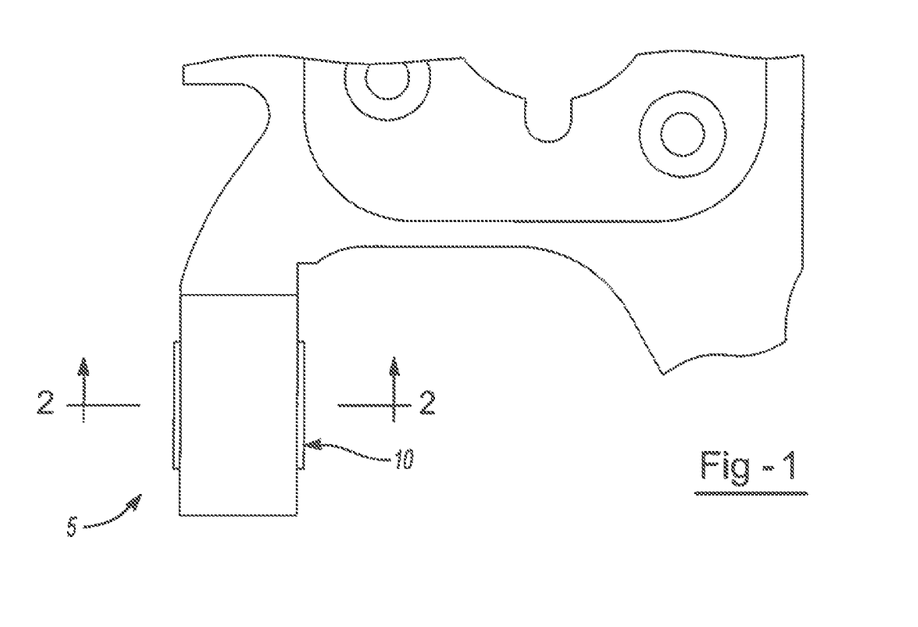
FIG. 1 is a partial, graphic side view of a suspension component including a knuckle and bushing assembly according to an exemplary embodiment.
Figure 2:
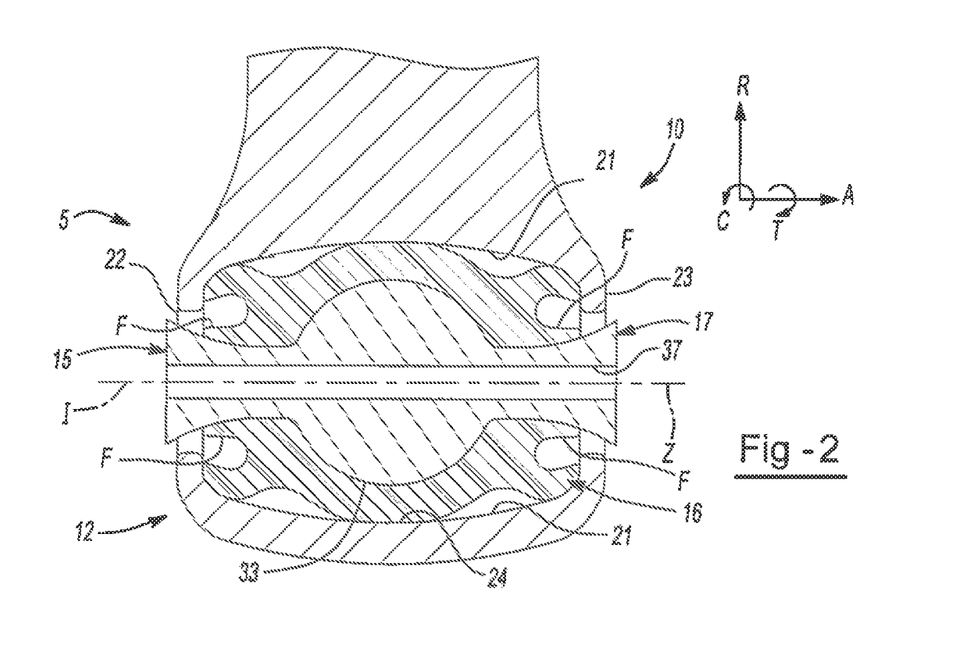
FIG. 2 is a partial sectional, graphic view of the integrated knuckle and bushing assembly according to the present disclosure.

In one exemplary embodiment according to the present disclosure a suspension coupling 5 may include a knuckle and bushing assembly 10 located at a knuckle boss, as shown in FIGS. 1 and 2. The knuckle and bushing assembly 10 includes a knuckle member 12 and a bushing member (or hub) 15. The suspension coupling 5 is designed to provide a coupling that exhibits a relatively high radial (R) and axial (A) stiffness along with a relatively low torsional (T) and conical stiffness (C) as shown by the directional arrows in FIG. 2 wherein the origin of the coordinates is referenced and used herein as if it is located at the physical center the knuckle suspension component 5 even though it is not shown that way in FIG. 2. The suspension coupling 5 is designed for coupling one suspension component to another and for transfer of forces between them. The suspension coupling 5 may be designed to have relatively minimal relative movement between the suspension components of the suspension coupling 5. To the extent any movement occurs, it will be generally a result of elastic deformation. The clevis (not shown) is coupled to the knuckle member 12 by the clevis pin (not shown) to directly transfer the forces applied to the one suspension component having the clevis to clevis pin and then to the knuckle member 12. Accordingly the forces transferred between the components of the suspension coupling 5 necessarily transfer through the bushing member 15. The bushing member 15 provides improved axial and radial stiffness, improved torsional and conical flexibility characteristics for the suspension coupling 5 while also having a lower cost and other improved characteristics.

Knuckle Member

The knuckle member 12 has a generally round structure but may have any appropriate shape for use in the suspension coupling 5. The knuckle member 12 has a wall defining a passage (or bore) 21 extending between a first end or side 22 and a second end or side 23. The knuckle member 12 is preferably produced as a cast aluminum metal piece using any known or appropriate casting parameters and production techniques. The wall defining the passage 21 of the knuckle member 12 is generally round and extends from the first end 22 to the second end 23 and may have a constant radius or diameter. The wall defining the passage 21 may also alternatively have a generally non-linear or curved shape in cross section from, the first end 22 to the second end 23 (not shown) wherein the radius (and therefore the diameter) of the passage 21 is smallest at the first end 22 and the second end 23 and has a central portion 24 that may have a larger radius. The wall defining the passage 21 may also alternatively have a constantly changing radius (not shown) from the first end 22 to the central portion 24 or it may have varying rates of change including zero. The wall defining the passage 21 may be formed during the casting process of producing the knuckle member 12 or may be formed afterward. The wall defining the passage 21 may be further formed by precision grinding or milling, or by using any other known or appropriate machining, cutting or forming process.

Figure 3:
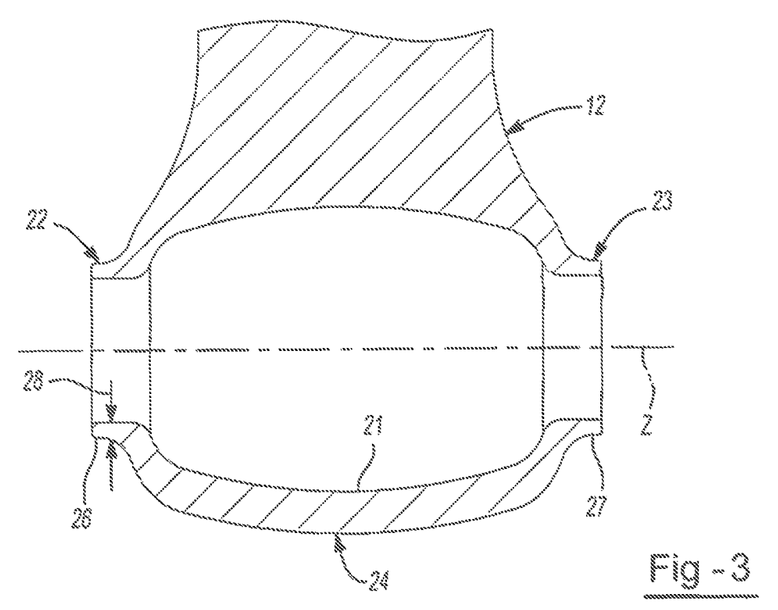
FIG. 3 is a partial sectional, graphic view of the knuckle member detailing a manufacturing step according to the present disclosure.

The knuckle member 12 and the wall defining the passage 21 may be formed to include a first extension member 26 located at the first end 22 of the passage 21 as best shown in FIG. 3. The knuckle member 12 and the wall defining the passage 21 may also be formed to include a second extension member 21 located at the second end 23 of the passage 21 as also shown in FIG. 3. Each extension members 26 and 27 may be unitary with the knuckle member 12 and further define the passage 21 in the knuckle member 12. The extension members 26 and 27 may be created as part of the cast forming of the knuckle member 12 and are formed in a first position wherein the extension members 26 and 27 are aligned with (or extend in) a direction substantially aligned with the center axis Z of the passage 21 of the knuckle member 12 as shown in FIG. 3. The extension members 26 and 27 have a thickness 28 that is selected such that the extension members 26 and 27 may be mechanically formed (e.g., the parent material of the knuckle member may be rolled, crimped, cold formed or otherwise moved) from the first position to a second position after the bushing member 15 has been located in the passage 21. In the second position, the extension members 26 and 27 are substantially aligned perpendicular with the center axis Z of the passage 21 and secure the bushing member 15 within the passage 21. In the second position, the extension members 26 and 27 define, at least in part, the first and second ends 22 and 23 of the passage 21. It should be understood that any known or appropriate process may be used for forming or moving the extension members 26 and 27 from the first position (FIGS. 3 and 4) to the second position (FIG. 2) such as cold forming, rolling, or any other suitable process that will plastically deform either or both of the first and second extension members 26 and 27 from the first position to the second position and will secure the bushing member 15 within the passage 21. While the extension members 26 and 27 are shown as both being cast in the first position, it should be understood that it is possible to cast the knuckle member 12 with one of the extension members 26 and 27 in the first position and the other in the second position so that only one of the extension members 26 and 27 need be moved to the second position.

Figure 4:
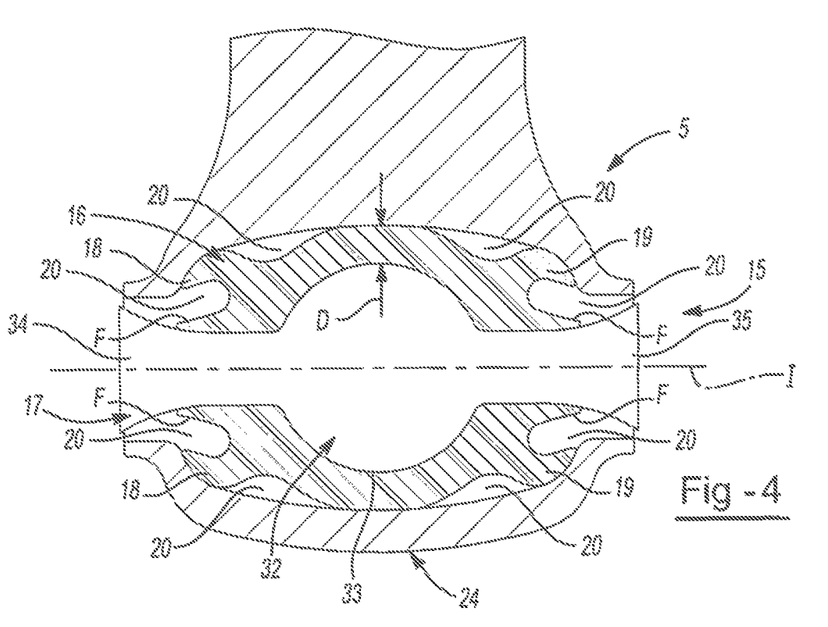
FIG. 4 is a partial sectional graphic view of the bushing member located in the knuckle member detailing a manufacturing step according to the present disclosure.

The bushing member 15 may have a generally cylindrical shape in that it may have a generally round cross section. The bushing member 15 may include a first or outer member 16 and a second or inner member 17 as best shown in FIGS. 2 and 4. The outer member 16 supports the inner member 17 in the passage 21 in the knuckle member 12 as best shown in FIG. 4. The bushing member 15 is for receiving and transferring the forces and moments between the suspension components and may be press-fit into engagement with the wall defining the passage 21 of the knuckle member 12 and therefore can have some movement within the passage 21 in response to the forces and movements of the suspension components. The outer member 16 is preferably made from an elastomeric material such as a rubber, or even a natural rubber. The elastomeric material of the outer member 16 is selected to exhibit good axial (A) and radial (R) direction stiffness when the bushing member 15 is located in the passage 21 as further explained herein. The bushing member 15 includes an outer member 16 having a formed or shaped outer surface and includes a plurality of formed portions for improving the performance of the bushing member 12. The outer member 16 is preferably a molded, generally annular member and includes a pair of extensions or ears 18 and 19 wherein one ear is located toward each end of the outer member 16. The ears 18 and 19 may define a generally scalloped outer surface structure for the elastomeric outer member 16. Each ear 18 and 19 is a portion of the outer member 16 that extends substantially radially outward having a given thickness and length for engaging the wall defining the passage 21 of the knuckle member 12 to provide the performance to the bushing member 15 within the knuckle member 12. Each ear 18 and 19 is defined on each side thereof by at least one valley-like recess 20 which is a reduced thickness of the outer portion 16 which allows the material of the ears 18 and 19 to be compressed within the passage 21 and against the ends thereof to affect the axial stiffness of the bushing member 15. The ears 18 and 19, when compressed during operation, provide substantial axial stiffness to the bushing member 15 within the passage 21 in the axial (A) direction, and partially in the radial (R) direction. Further, the recesses 20 on each side of each ear 18 and 19 provide lower stiffness and therefore greater flexibility of the bushing member 15 in the conical (C) and torsional (T) directions.

When a force is transferred to the knuckle member 12 through the bushing member 15, one or more of the ears 18 and 19 will deform about a location generally within the passage 21 in the knuckle member 12 to change the shape of the recesses 20 on each side of the ears 18 and 19 which is also further defined by the flange F of the outer member 16 and extending along the inner member 17. The co-action of the ear 18 and the flange F imparts additional axial stiffness to the integrated knuckle and bushing assembly 5. At the same time the presence of the recess 20 facilitates a generally reduced stiffness of the bushing member 15 in the conical (C) and torsional (T) directions, as compared with the same structure and there being no recess. In this manner, it can be seen that competing design tensions may be resolved surprisingly by an elegantly straightforward design solution.

The inner member 17 of the bushing member 15 may include a shaped body for imparting certain performance characteristics to the bushing member 15. The inner member 17 may be made from a metal or steel material such as cold formed steel having relatively high strength for coupling with the clevis pin (not shown) and transferring the relatively high loads associated with a suspension of a vehicle. Any other known or appropriate material may be used for the inner member 17. The inner member 17 preferably includes a central portion 32 having a generally rounded or spherical outer periphery 33. The outer periphery 33 may have a generally constant radius but may also have a varying radius for affecting the performance of the bushing member 15. The inner member 17 further includes first and second end portions 34 and 35 extending in generally opposite directions along a center or axial axis (1) of the inner member 17. The first and second end portions 34 and 35 of the inner member 17 may have a generally frusto-conical shape wherein the smaller ends of the substantially conical shapes merge with the outer periphery 33 of the central portion 32 and the other larger end portions of the first and second end portions 34 and 35 extend to be aligned with the first and second ends 22 and 23 of the knuckle member 12. The first and second end portions 34 and 35 may have a generally round cross section as taken perpendicular to the central axis I and such round cross section will have a given radius or diameter. The radius of the cross sections along the first and second end portions 34 and 35 may vary at a constant, a non-constant or at a zero rate from the central portion 32 to the first and second ends.

The inner member 17 may include one or more passage, bore, or other through-hole 37 extending along the center axis I through the first and second end portions 34 and 35 and the central portion 32. The through-hole 37 may be formed in the inner member 17 when initially producing the inner member 17 or the through-hole 37 may be drilled or machined through the inner member 17 after the inner member 17 is produced. Once the inner member 17 is produced, the outer member 16 may be molded onto the inner member 17. An adhesion promoter such as a potassium-based coating may be applied to the metal inner member 17 prior to the inner member 17 being placed in the mold machine and prior to the outer member 16 being molded thereon. The adhesion promoter may be of any known or appropriate type and is intended to improve the adhesion of the elastomeric material of the outer member 16 to the metal of the inner member 17 such that forces applied to the bushing member 15 are effectively transferred between the inner member 17 and outer member 16. The inner member 17 (with or without an optional adhesion promoter) may be placed in a mold cavity and the mold closed and then the material of the outer member 16 may be introduced (e.g., by compression molding, injection-molding, or otherwise) into the mold cavity to form around the inner member and to fill out the mold cavity which produces the outer member having the ears 18 and 19 defined on each side by the recesses 20. The bushing member 15 may be produced to have a size that is slightly larger than the size of the passage in the knuckle member 12 so that the outer member 16 of the bushing member may be compressed or press-fit within the passage 21 while the first and second extension portions 26 and 27 of the wall defining the passage 21 are still in the first position as best shown in FIG. 4. The bushing member 15 is located and aligned within the passage 21 and then the first and second extension portions 26 and 27 of the wall defining the passage 21 are formed into their second positions to secure the bushing member 15 within the passage 21 as best shown in FIG. 2. It may be appreciated that it is also possible to produce the knuckle member 12 only has one of the first and second extension portions 26 and 27 of the wall defining the passage 21 in the first position and the other of the first and second extension portions 26 and 27 of the wall defining the passage 21 in the second position. In this alternative, the bushing member 15 may be inserted or press-fit in the one of the first and second extension portions 26 and 27 of the wall defining the passage 21 that is in the open position and aligned within the passage 21 and secured therein by the other of the first and second extension portions 26 and 27 of the wall defining the passage 21 that is in the second position. Then, only the one of the first and second extension portions 26 and 27 of the wall defining the passage 21 that is in the first position need be formed to secure the bushing member 15 within the passage 21 of the knuckle member 12.

In addition to the bushing member 15 exhibiting a relatively low torsional (T) stiffness and low conical (C) stiffness and a relatively high axial stiffness if may be desirable that the bushing member exhibit a relatively high radial (R) stiffness when installed in the passage 21 of the knuckle member 12. This may be achieved by shaping and dimensioning at least the central portion 33 of the bushing member 15. Once the bushing member 15 is located, aligned and secured within the passage 21 of the knuckle member 12, the outer member 16 of the bushing member 15 may have a thickness D in the area of the central portion 33 of the inner member 17 and aligned with central portion 24 of the knuckle member 12 wherein the thickness may be in the range of between approximately two (2 mm) and three (3 mm) millimeters after the knuckle member 15 is located within the passage 21 and the thickness D remains in the range of between approximately two (2 mm) and three (3 mm) millimeters during operation of integrated knuckle bushing assembly 10 in the suspension coupling 5 in the vehicle.

A method for manufacturing integrated knuckle bushing assembly 10 for use in the suspension assembly 5 includes producing the knuckle member 12 having the passage 21 extending there through. The knuckle member 12 is preferably produced using a casting process and an aluminum material. The knuckle member 12 is preferably cast having the first extension member 26 located at the side 22 of the passage 21 of the knuckle member 12. The passage 21 further defines the second extension member 27 located at the second side 23 of the passage 21. As best shown in FIG. 3, the first and second extension members 26, 27 are shown as initially extending in a direction substantially aligned with the axial direction of the passage 21. In one embodiment, one of the first and second extension members 26, 27 is formed in a closed position such as that shown in FIG. 4 and the other of the first and second extension members 26, 27 is formed in the open position as shown in FIG. 3. As part of the method, the bushing member 15 is produced having the passage 37 extending there through and the plurality of annular reduced portions or recesses 20 located in the exterior surface of the outer member 16 of the bushing member 15. The bushing member 15 is axially aligned in the passage 21 in the knuckle member 12 by press fitting the bushing member 15 in the passage 21 through the end 22. After the bushing member 15 is located within the knuckle member 12, the first extension member 26 is moved from the open position shown in FIG. 3 to the closed position shown in FIG. 4 by rolling or forming the first extension member 26. The passage 21 of the knuckle member may be machined to that the wall of the passage has a relatively smooth finish for receiving the bushing member 15.

In producing the bushing member 15, there is first manufactured the metal inner member 17 having the predefined shape as shown in FIGS. 2 through 4. The inner member 17 is preferably made using a cold forming process appropriate for producing a metal part having the shape and details as noted. The passage 37 is formed, such as by drilling along the axial center of the inner member 17, using any known or appropriate manufacturing process. Once the metal inner member 17 is produced, it may be prepared for receiving the elastomeric material outer member 16 such as my preparing the surface of the inner member 17 and applying a phosphate-based primer coating for improving the adhesion of the elastomeric material to the metal. It should be understood that any known or appropriate materials and methods for promoting adhesion of the elastomeric outer member 16 to the metal inner member 17 may be used including processes such as blasting and blast coating.

Once the inner member 17 is prepared, it may be located in a mold having the shape for forming the outer member 16 including for forming the ears 18, 19 and the recesses 20. Once the inner member 17 is located and positioned in the mold, the elastomeric material may be introduced to the mold for forming the outer member 16 on the inner member 17. The elastomeric material may be selected from any known or appropriate group of elastomeric materials but may be preferably selected from the group of materials including a synthetic material, a rubber, and a natural rubber material that is suitable for being over-molded, on the inner member 17 and to function as the outer member 14 of the bushing member 15. The mold may be used in an injection molding machine (not shown) and the elastomeric material may be injected into the mold to form the outer member 16 or any other known or appropriate method of molding may be utilized. Once the outer member 16 is formed and sufficiently hardened, the bushing member 15 is formed and may be removed from the mold.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination.

The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A method for manufacturing an integrated knuckle and bushing assembly for use in a suspension assembly in a vehicle, the method comprising the steps of:
producing a knuckle member having a passage extending there through, the knuckle member for providing support for a suspension member, the knuckle member having a first extension member located at one end of the passage of the knuckle member and further defining the passage and a second extension member located at a second end of the passage of the knuckle member and further defining the passage, wherein the first extension member and the second extension member each extend in a direction aligned with a center axis of the passage;
producing a bushing having a passage extending there through and plurality of annular reduced portions located in an exterior surface of the bushing, wherein the bushing includes an outer member having a center portion, a first ear, and a second ear, wherein the ears are spaced apart by the center portion;
locating the bushing to be axially aligned in the passage in the knuckle member so that the knuckle member contacts the first ear and the second ear while the first extension member and the second extension member each extend in a direction aligned with the center axis of the passage, the bushing for providing improved radial, torsional and conical support to the suspension member to be located within the passage in the bushing; and
forming the first extension member to extend at least partially in a direction perpendicular with the center axis of the passage and over at least a portion of the first end of the bushing; and
forming the second extension member to extend at least partially in a direction perpendicular with the center axis of the passage and over at least a portion of the second end of the bushing to secure the bushing within the passage of the knuckle member, wherein the steps of forming the first extension member and forming the second extension member are after the step of locating the bushing.

2. The method for manufacturing an integrated knuckle and bushing assembly of claim 1, wherein the step of producing a knuckle member further comprises the step of casting a knuckle member comprising aluminum.

3. The method for manufacturing an integrated knuckle and bushing assembly of claim 1 wherein the step of producing the bushing member includes the steps of producing an inner member having a predefined shape, locating the inner member in a mold, molding the outer member on the inner member, the outer member including a plurality of extension members for improving the stiffness exhibited by the bushing member within the passage to exhibit a lower torsional and conical stiffness while exhibiting a higher radial and axial stiffness, wherein each of the extension members of the outer member includes one of the ears.

4. The method for manufacturing an integrated knuckle and bushing assembly of claim 3 wherein the step of forming the inner member includes the step of cold forming the inner member from a steel material, the inner member being formed to have a spherical center portion and two end portions extending in opposite directions from the center portion.

5. The method for manufacturing an integrated knuckle and bushing assembly of claim 3 wherein the step of forming the inner member includes the step of forming two end portions of the inner member to have a frusto-conical shape wherein a narrow portion of each end portion is located proximal a center portion and a broader portion of each end portion is located distal the center portion of the inner member, and wherein the center portion of the inner member is spherical.

6. The method for manufacturing an integrated knuckle and bushing assembly of claim 1 wherein the step of locating the bushing includes locating the bushing in radial compression within the passage of the knuckle member.

7. The method for manufacturing an integrated knuckle and bushing assembly of claim 1 wherein the step of producing the bushing includes the step of molding the outer member from an elastomeric material selected from the group including a synthetic material, a rubber, and a natural rubber material that is over-molded on an inner member.

8. A method for manufacturing an integrated knuckle and bushing assembly comprising the steps of:
producing a knuckle member having a passage extending there through, the knuckle member for providing support for a suspension member, the knuckle member having a first extension member located at one end of the passage of the knuckle member and further defining the passage and a second extension member located at a second end of the passage of the knuckle member and further defining the passage, wherein the first extension member and the second extension member each extend in a direction aligned with a center axis of the passage;
producing a bushing having a passage extending there through and plurality of annular reduced portions located in an exterior surface of the bushing, wherein the bushing includes an outer member having a center portion, a first ear, and a second ear;
locating the bushing to be axially aligned in the passage in the knuckle member so that the knuckle member contacts the first ear and the second ear while the first extension member and the second extension member each extend in a direction aligned with the center axis of the passage, the bushing for providing improved radial, torsional and conical support to the suspension member to be located within the passage in the bushing; and forming the first extension member to extend at least partially in a direction perpendicular with the center axis of the passage and over at least a portion of the first end of the bushing; and forming the second extension member to extend at least partially in a direction perpendicular with the center axis of the passage and over at least a portion of the second end of the bushing to secure the bushing within the passage of the knuckle member;

wherein the knuckle member has an arcuate portion generally extending between the first extension member and the second extension member and generally perpendicular to the first passage.

9. A method for manufacturing an integrated knuckle and bushing assembly for use in a suspension assembly in a vehicle, the method comprising the steps of:

producing a knuckle member having a passage extending there through, the knuckle member for providing support for a suspension member, the knuckle member having a first extension member located at one end of the passage of the knuckle member and further defining the passage and a second extension member located at a second end of the passage of the knuckle member and further defining the passage, wherein the first extension member extends in a direction aligned with the center axis of the passage and the second extension member is formed to close the second end of the passage when the knuckle member is produced;

producing a bushing having a passage extending there through and a plurality of annular reduced portions located in an exterior surface of the bushing, wherein the bushing includes an outer member and an inner member, the outer member having a center portion, a first ear, and a second ear, wherein the ears are spaced apart by the center portion, and wherein the inner member includes a spherical portion;

locating the bushing to be axially aligned in the passage in the knuckle member by press fitting the bushing in the passage through the first end, so that the knuckle member contacts the first ear and the second ear while the first extension member extends in a direction aligned with the center axis of the passage, the bushing for providing improved radial, torsional and conical support to the suspension member to be located within the passage in the bushing; and forming the first extension member to extend at least partially in a direction substantially perpendicular with the axial axis of the passage and to overlap with at least a portion of the first end of the bushing to secure the bushing within the passage of the knuckle member, wherein the step of forming the first extension member is after the step of locating the bushing.

10. The method for manufacturing an integrated knuckle and bushing assembly of claim 9, wherein the step of producing a knuckle member further comprises the step of casting the knuckle member comprising aluminum, and wherein the knuckle member has an arcuate portion generally extending between the first extension member and the second extension member and generally perpendicular to the passage of the knuckle member.

11. The method for manufacturing an integrated knuckle and bushing assembly of claim 10 wherein the step of producing the knuckle member further comprises the step of machining at least one wall in the passage of the knuckle member prior to the step of forming the first extension member.

12. The method for manufacturing an integrated knuckle and bushing assembly of claim 11 wherein the step of producing the bushing includes the steps of locating the inner member in a mold, molding the outer member from an elastomeric material on the inner member, the outer member including a plurality of extension members for improving the axial stiffness exhibited by the bushing member within the passage and a plurality of reduced thickness portions for lowering the torsional and conical stiffness of the bushing within the knuckle member.

13. The method for manufacturing an integrated knuckle and bushing assembly of claim 12 wherein the step of forming the inner member includes the step of cold forming the inner member from a steel material, the inner member being formed to have the spherical portion and two end portions extending in opposite directions from the spherical portion.

14. The method for manufacturing an integrated knuckle and bushing assembly of claim 13 wherein the step of forming the inner member includes the step of forming the two end portions of the inner member to have a frusto-conical shape wherein a smaller portion of each end portion is located proximal the center portion and a larger portion of each end portion is located distal the center portion of the inner member, wherein the center portion includes a radius that when measured from a center axis of the passage is larger than a distance from the center axis to an upper edge of one or both end portions of the inner member.

15. The method for manufacturing an integrated knuckle and bushing assembly of claim 10 wherein the step of producing the bushing includes locating the inner member in a mold, molding the outer member from an elastomeric material on the inner member, the outer member including a plurality of extension members for improving the axial stiffness exhibited by the bushing member within the passage and a plurality of reduced thickness portions for lowering the torsional and conical stiffness of the bushing within the knuckle member.

16. The method for manufacturing an integrated knuckle and bushing assembly of claim 9 wherein the step of producing the knuckle member further comprises the step of machining at least one wall in the passage of the knuckle member prior to the step of forming the first extension member.

17. The method for manufacturing an integrated knuckle and bushing assembly of claim 9 wherein the step of producing the bushing includes the steps of producing the inner member having a predefined shape, locating the inner member in a mold, molding the outer member on the inner member, the outer member comprising elastomeric material including a plurality of extension members for improving the axial stiffness exhibited by the bushing member within the passage and a plurality of reduced thickness portions for lowering the torsional and conical stiffness of the bushing within the knuckle member.

18. The method for manufacturing an integrated knuckle and bushing assembly of claim wherein the step of forming the inner member includes the step of cold forming the inner member from a steel material, the inner member being formed to have the spherical portion and two end portions extending in opposite directions from the spherical portion.

19. The method for manufacturing an integrated knuckle and bushing assembly of claim 18 wherein the step of forming the inner member includes the step of forming the two end portions of the inner member to have a frusto-conical shape wherein a smaller portion of each end portion is located proximal the spherical portion and a larger portion of each end portion is located distal the spherical portion of the inner member.

20. The method for manufacturing an integrated knuckle and bushing assembly of claim 17 wherein the step of producing the bushing includes the step of molding the outer member from a material selected from a group including a synthetic material, a rubber, and a natural rubber material wherein the outer member is over-molded on the inner member.

* * * * *